Patented June 17, 1941

2,245,745

UNITED STATES PATENT OFFICE 2,245,745

METALLIC COATING

George L. Ball, Pittsburgh, Pa., assignor to Ball Chemical Company, a corporation of Pennsylvania No Drawing. Application July 12, 1939,
Serial No. 284,023

2 Claims. (Cl. 91—70)

This invention relates to an aluminum pigmented coating composition for metals.

It is the object of my invention to provide and utilize an aluminum pigmented coating composition for baking on metals, so constituted that it may be heat treated at high temperature, and which, when so heat treated, gives a smooth insoluble coating having in large measure the appearance of a plating of nickel, chromium, steel, and other lustrous metals.

In making up my coating composition I use an alloyed or unalloyed aluminum powder, or dust, which has been triturated to a state of impalpability. It is impossible accurately to define the small particle size to which the aluminum dust has been brought in terms of a screen mesh. This is for the reason that the finest screens available are screens of 400 mesh per square inch, and they cannot be used to define the particle size of the aluminum powder, or dust. In obtaining this impalpable aluminum dust, a finely crushed and ground aluminum is screened through a 400 mesh screen and from the powder which passes through the screen the finer end, amounting to from about 5% to 10% the total, is collected by very moderate suction. In this collection of the finer end of the powdered, and screened, aluminum the vacuum effect of the collecting suction is no greater than will correspond to about 2 mm. of mercury.

This metallic dust has properties not possessed by an aluminum powder, or dust, brought to a lesser and more usual order of trituration. By rough approximation on a grating, and by Brownian movement, it appears substantially all to be of a fineness in average particle size, which would correspond to that obtained by screening powdered aluminum through a screen having at least 700 to 800 meshes per square inch. Its covering qualities as a pigment are more than twice that of aluminum powdered to a fineness of particle size measurable in a 400 mesh screen, and many times that of the powdered aluminum commonly used as a pigment in paints and varnishes.

When associated with a vehicle of suitable sort, this finely triturated aluminum, collected as above described, has therefore such covering qualities that it may be used in a quantity equal to a small fraction of the weight of the ingredient or ingredients of the vehicle which form the coherent substance of a film including the pigment.

I further have discovered that because of the small proportional quantity of the metallic pigment which need be used to give the pigmentation desired, the pigment may be so embedded in a thin film of vehicle that such thin film has the approximate qualities of the vehicle, or coherent substance of the film, in resistance to alkalis and acids, and also that a film so pigmented has the appearance of a coating of lustrous polished metal rather than the relatively granular, and lusterless, appearance imparted by the aluminum powder commonly used as a pigment.

The vehicle with which this pigment is associated may be considered as consisting of a drying oil and a resin. In such vehicle the reduced drying oil gives heat-convertibility and elasticity, while the oil-soluble resin gives wetting qualities for the pigment, and imparts gloss and hardness to a film of the composition. If the material coated by the composition is to be used in contact with foods, or food products, it is important that the resin should either have a low acid number, or that it should acquire an insoluble condition by heat conversion. This is primarily to the end that the coating should not be affected by the alkalinity of foods, or food products, with which it may come into contact. For roller application it is desirable to utilize an oil-soluble, heat convertible resin of specialized sort, rather than to use a vehicle composed of drying oil and oil-soluble resin. This will be hereinafter explained.

A formula involving the use of the impalpably powdered aluminum which I have found satisfactory for general application, as by spraying in a fine mist, by brush application, or by dipping, may be given as follows:

|   | Pounds |
|---|---|
| Reduced linseed oil | 100 |
| Coumarone-indene resin | 50 |
| Ester gum | 50 |
| Aluminum powder (triturated to a particle size immeasurable by screening) | 10 |

To this pigmented vehicle, in preparation for its use, add evaporative solvent, suitably in a weight equal to the weight of the vehicle. For example, to the pigmented vehicle of the formula I prefer to add 200 lbs. of mixed aromatic and aliphatic solvent, such for example as a solvent consisting 80% of refined solvent naphtha and 20% of Stoddard (aliphatic) solvent.

My coating composition made in accordance with this formula is applied, preferably by dipping, brushing, or spraying it in a fine mist, on a metallic body capable of sustaining relatively high temperature. The composition, which as above exemplified contains the maximum proportion of pigment which I have found it necessary under any circumstances to use, is particularly suitable for the coating of the light gauge steel used for cans, and for container caps, and which is known in the trade as "black iron." After application to the base material, which for purposes of exemplification may be assumed to be light gauge sheet metal of that sort, the coated metal is first subjected to a short period of heating at moderate temperature to evaporate the solvent and set the coating. It is then subjected briefly to relatively high temperature, adequate rapidly to effect heat-conversion, but below that at which ingredients of the vehicle carbonize, or to a great extent volatilize. With a composition containing heat-stable and non-volatile resins, and a reduced drying oil, the temperature at which heat-conversion is effected may be almost as high as 1200° F., while if a resin of more volatile sort be used as, or in the vehicle, the temperature of heat-treatment desirably is maintained below about 750° F. In any case, I prefer to effect heat-treatment at a temperature not greatly below 600° F. At a temperature of about 600° F. I have found heat-treatment for one-half minute to be adequate, and at a temperature of about 700° F. I have found that heat-treatment for one-quarter minute is sufficiently adequate to effect heat-conversion.

By so applying the coating composition as to spread it thinly on the base, I obtain after heat conversion a coating having a thickness no greater than 0.25 to 0.50 mil. Even though the coating be as thin as indicated, the pigment is so completely embedded in, and encapsulated by, the heat-converted vehicle, that it does not detract appreciably from the alkali resistance and insolubility possessed inherently by the vehicle itself, or acquired by it when subjected to heat-conversion. The coating film is elastic and has the gloss of the heat-converted vehicle, since the aluminum is included in such small quantity and in such extraordinary fineness of division that it does not detract from the luster of the film by presenting the granular and lusterless effect generally associated with alnuminum paints and varnishes, in which the aluminum pigment is powdered only to a screen-measurable order of fineness, and in which the pigment must be included in far greater proportion than I use, if a coating composition providing a film of uninterruptedly pigmented appearance is to be provided.

When used upon base material less exacting than black iron in its requirement for pigmentation in a coating film applied to it, I may utilize a coating composition made in accordance with the formula which includes a lesser proportion of the impalpable aluminum dust. One such formula may be given as follows:

| | Pounds |
|---|---|
| Reduced linseed oil | 200 |
| Coumarone-indene resin | 50 |
| Ester gum | 50 |
| Aluminum dust (triturated to a particle size immeasurable by screening) | 12 |

In preparation for use, I add to this composition also evaporative solvent in a weight equal to the weight of the vehicle preferring, for example, to add to the composition as given above 400 lbs. of a mixed aromatic and aliphatic solvent consisting, for example, 80% of refined solvent naphtha, and 20% Stoddard (aliphatic) solvent.

This second formula also gives a coating composition for general application, as by brushing, dipping, or spraying in a fine mist. One distinction from the formula first above given is in its increased proportion of the reduced drying oil and consequently in its increased susceptibility to heat conversion. In the first formula the impalpable aluminum dust is included in a proportion of one pound of aluminum to each forty pounds of total vehicle including the evaporative solvent and in a proportion of one pound of aluminum to each twenty pounds of non-evaporative vehicle constituting the film-forming content of the composition. In the second formula it is included in a proportion of one-fiftieth the weight of total vehicle, and one-twenty-fifth the weight of the non-evaporative vehicle.

Other resins may be used, wholly, or partially, to replace coumarone-indene resin and ester gum in the formulae. For example I may use a petroleum-derived resin, such as the petroleum resins disclosed in United States patent to Chittick, No. 1,891,079, or in United States patent to Osterstrom, No. 2,009,902, and may use such terpene resins as are non-volatile up to a relatively high temperature.

Those resins which are definitely molding resins, and which are, therefore, lacking in oil-solubility and thermoplasticity, are not usable in my composition, either alone or in association with a drying oil.

I may, for example, use oil-soluble phenolaldehyde and urea-aldehyde resins, such as those in which the condensate is modified by a polyhydric alcohol and polybasic acid and also by a suitable fatty acid, such as the fatty acids of drying oils and non-drying oils of non-mineral origin. Such resins may be exemplified by the resins disclosed in United States patent to Hill, No. 1,877,130, United States patent to Moore, No. 1,867,583, and United States patent to Kneale and Wohlgemuth, No. 2,064,614.

I also may, for example, use, either in association with a drying oil, or by themselves, alkyd resins modified by reaction with the fatty acids of non-mineral oils, including particularly the drying oils. Such resins may be exemplified by the resins disclosed in United States patent to Arsem, No. 1,098,776, United States patent to Friedburg, No. 1,119,592, United States patent to Ellis, No. 1,985,614, and United States patent to Kienle, No. 1,893,873.

For application by roller coating, I have found most suitable one of those modified alkyd resins which includes the fatty acid of a drying oil, and additionally or alternatively a drying oil itself. This is because I have found that such resin, when used as the entire non-evaporative vehicle of the coating composition, has such a fictitious body, or gel structure, that it spreads over the surface of a light gauge metal body under the roller, without tending objectionably to pile up on the surface of the metal base, or to be wiped therefrom by the roller. As used with an evaporative solvent of high solvent power, a high order of oil-solubility is not necessary, if the resin be but thermoplastic and elastic. A desirable formula for a coating composition for application by roller coating may be given, as follows:

| | Pounds |
|---|---|
| Modified alkyd resin | 100 |
| Mixed xylol and toluol solvent | 100 |
| Aluminum powder (triturated to a particle size immeasurable by screening) | 5 |

In heat-treating a metal base having this composition thereon, it is desirable that the temperature should not substantially exceed 700° F., for a period of less than one minute in order that no substantial proportion of the vehicle may be lost by volatilization.

The salient features of my coated product, whether the coating composition be applied by a roller, or by spraying, brushing, or dipping, are that the coating is thin; that because of the gloss of resin unaffected by the aluminum in its high state of division, and in its perfect leafing, the product has the appearance of a polished lustrous metallic surface; and that the aluminum pigment is so embedded in and encapsulated by the heat-converted vehicle that the coating has the chemical inertness and insolubility of the heat-converted vehicle (in spite of the thinness of the coating) without detraction from those qualities by the pigment; and that the coating has such coherence and elasticity that on a light gauge metal base the metal may be pressed, stamped, or rolled into shapes without injury to the coating.

This is in part a continuation of my application Serial No. 158,165, filed August 9, 1937.

I claim as my invention:

1. The herein described method of forming a thin aluminum-pigmented alkali-resistant baked coating on metal which comprises the steps of pigmenting a film-forming heat-convertible vehicle containing a drying oil and an oil-soluble thermoplastic resin of low acid number capable of sustaining relatively high temperature with aluminum dust in such impalpably fine division and in such small content not substantially exceeding one part by weight of the aluminum dust to twenty parts by weight of the film-forming non-evaporative content of the vehicle that in a thin film about 0.25 to 0.50 mil in thickness the aluminum pigment lies protectively covered by the vehicle, spreading a thin coating of the so pigmented vehicle on the base metal, and heat converting the said thin film on the base metal by subjecting the film to a treating temperature of about 700° F. for one-fourth minute to produce on the base metal an adherent coating having high alkali resistance by virtue of the encapsulation of the aluminum pigment by the heat-converted vehicle.

2. The herein described method of forming a thin aluminum-pigmented alkali-resistant baked coating on metal which comprises the steps of pigmenting a film-forming heat-convertible vehicle containing a drying oil and an oil-soluble thermoplastic resin of low acid number capable of sustaining relatively high temperature with aluminum dust in such impalpably fine division and in such small content not substantially exceeding one part by weight of the aluminum dust to twenty parts by weight of the film-forming non-evaporative content of the vehicle that in a thin film of about 0.25 to 0.50 mil in thickness the aluminum pigment lies protectively covered by the vehicle, spreading a thin coating of the so pigmented vehicle on the base metal, and heat converting the said thin film on the base metal by subjecting the film to a treating temperature of about 600° F. to 1200° F. for a period of time less than one minute to form on the base metal an adherent coating having high alkali resistance by virtue of the encapsulation of the aluminum pigment by the heat-converted vehicle.

GEORGE L. BALL.